A. T. BALDWIN, DEC'D.
C. P. BALDWIN, EXECUTRIX.
DIFFERENTIAL GAGE.
APPLICATION FILED SEPT. 24, 1917.
1,394,660.
Patented Oct. 25, 1921.
2 SHEETS—SHEET 1.
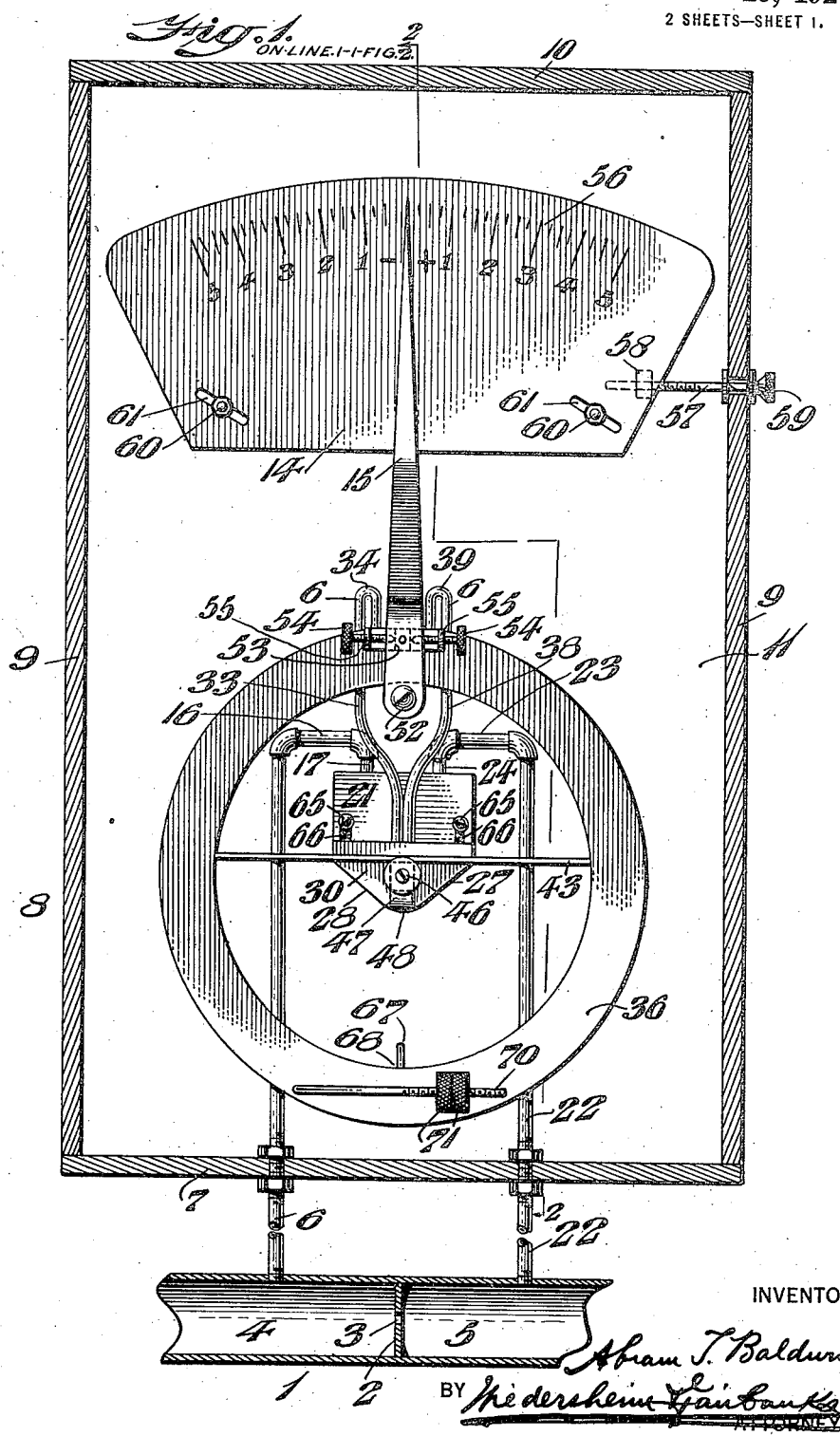
INVENTOR
Abram T. Baldwin.

UNITED STATES PATENT OFFICE.

ABRAM T. BALDWIN, OF DETROIT, MICHIGAN; CATHERINE P. BALDWIN EXECUTRIX OF SAID ABRAM T. BALDWIN, DECEASED.

DIFFERENTIAL-GAGE.

1,394,660.  Specification of Letters Patent.  Patented Oct. 25, 1921.

Application filed September 24, 1917. Serial No. 193,046.

*To all whom it may concern:*

Be it known that I, ABRAM T. BALDWIN, a citizen of the United States, residing at Detroit, county of Wayne, State of Michigan, have invented a new and useful Differential-Gage, of which the following is a specification.

My invention consists of a novel construction of differential gage, wherein I am enabled to indicate or ascertain the differences of the pressure of a gas, fluid or liquid under pressure in separate conduits or, in other words, the differential of the static heads, which is required to be measured in a novel and accurate manner, and by means of a novel mechanism and assemblage of indicating devices, whereby the apparatus is not only greatly simplified, but is constructed in an extremely compact manner, friction being reduced to a minimum and the differential of the static heads which is required to be measured being accurately indicated.

It further consists of a novel construction of a mercury or liquid cup and a movable cap and its adjuncts, whereby a mercury seal is provided in a simple and efficient manner, suitable connections being provided for said mercury seal to a movable member or annular tube, which is pivotally mounted upon suitable fixed points and carries a pointer coacting with the gage or dial.

It further consists of a novel construction of mercury or other liquid seal, an annular tube pivotally supported and conduits common to said seal and chambers in said tube.

It further consists of novel means of calibrating and setting the gage at zero.

It further consists of other novel features of construction, all as will be hereinafter fully set forth.

For the purpose of illustrating my invention, I have shown in the accompanying drawings one form thereof which is at present preferred by me, since the same will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a section on line 1—1, Fig. 2, of a differential gage embodying my invention, certain of the parts being shown in elevation.

Fig. 2 represents a section on line 2—2, Fig. 1, certain of the parts being shown in elevation.

Fig. 3 represents a section on line 3—3 Fig. 2.

Fig. 4 represents a section on line 4—4 Fig. 2.

Fig. 5 represents a section on line 5—5 Fig. 2.

Fig. 6 represents a side elevation, partly in section, of an alternative form of dial adjusting device.

Similar numerals of reference indicate corresponding parts in the figures.

Referring to the drawings:

1 designates a conduit which may either have a partition 2 therein provided with a port 3 or else be of reduced or contracted diameter at this point whereby chambers or pressure reservoirs 4 and 5 are formed which serve as conduits for gases, fluids or liquids under pressure, the differential of the static heads of which it is desired to measure.

The chamber 4 has a pipe 6 leading upwardly therefrom through the base 7 of the casing 8, which has the sides 9, top 10, rear wall 11 and front wall 12 in which latter is the opening 13, through which the dial 14 is discernible, the manner of supporting said dial and its coaction with the finger or pointer 15 being hereafter referred to. The pipe 6 after passing through the base 7 is given a lateral bend at 16 and is then deflected downwardly, as indicated at 17, so as to form a gooseneck which discharges into the chamber 18, which is in the form of an inverted cup having the top 19 and the depending walls 20 and 21.

From the chamber 5 leads upwardly the pipe 22 through the base 7, said pipe having the laterally deflected member 23 and the downwardly deflected member 24 forming a gooseneck which discharges into the chamber or inverted cup 25 formed by the top 19 and the depending walls 20 and 26×. As will be understood from Fig. 2, I preferably form the inverted cups 18 and 25 within a single casting having the top 19 and the central wall 20 common to both cups, the lower extremities of said cups dipping into the body of mercury or similar liquid indicated at 26, which is contained in the stationary receptacle 27, which has the bottom 28, the rear wall 29 and the front wall 30.

It will be apparent from the construction best seen in Figs. 2, 3 and 4 that a simple, compact and efficient liquid seal is thus formed, wherein the receptacle 27 which is stationary and secured to the rear wall 11 by a screw or other fastening device 31, serves as a container for the mercury or other liquid 26, while the inverted cups 18 and 25 serve as the other element of said mercury seal.

32 designates a gooseneck which leads from the cup or chamber 25 to the vertical member 33, see Fig. 1, which terminates in the gooseneck 34, which discharges into the chamber 35, of the annular movable member or tube 36 which may be copper or other metal or glass if desired.

The gooseneck 37, see Figs. 2 and 3, leads to the upright member 38 which terminates in the gooseneck 39 which discharges into or communicates with the top of the chamber 40, said chambers 35 and 40 being continuous at their lower portions, as seen in Fig. 5, but separated from each other at their top by the partition 41, as will be understood from Figs. 2 and 5. The lower portion of said chambers 35 and 40 contains oil, mercury or similar liquid, as indicated at 42, the normal height of said oil being indicated in Fig. 5. It will be apparent that the lighter the oil and the lower its viscosity, the greater will be the accuracy and sensitiveness of the gage.

The annular tube or oscillatory member 36 is provided with a diametric bar or plate 43, which carries the pivot block 44, which is provided with the front pivot seat or fulcrum point 45, in which the front pivot 46 is seated, said pivot passing through and being supported in the front arm 47 of the bracket 48. The rear arm 49 of said bracket is secured to the wall 30 and carries the rear pivot 50, which engages the contiguous rear pivot seat in the pivot block 44.

51 designates a plate attached to the front of the annular tube 36 to which is secured by any suitable fastening means 52 the lower end of the pointer 15, the latter carrying on its rear the block 53, against the sides of which bear the ends of the adjusting screws 54, which are mounted in the ears 55, see Figs. 1 and 2, said ears being attached to the top of said annular tube 36 in any suitable manner and said adjusting screws being adapted to accurately adjust the position of the pointer 15 and as their function and manner of adjustment will be apparent to those skilled in the art, any further description thereof is thought to be unnecessary.

The dial 14 is provided with a scale 56 which may have etched therein in a suitable color divisions of tenths, twentieths and hundredths of any desired unit of measurement and is accurately adjusted by means of the threaded stem 57, which engages the lug 58 on the rear thereof, said stem being rotatably mounted in the wall 9 and manipulated by means of the head 59, said dial being locked in its adjusted position by means of the screws or fastening devices 60 which may be supported in any suitable manner and pass through the inclined slots 61.

If desired, I may employ the dial adjusting device seen in Fig. 6, wherein the adjusting screw 62 engages the lug 58 and has its outer end stepped into or rotatably mounted on the side wall 9, at 63, and is provided with the head 64 for convenient manipulation.

The mercury cup heretofore described may be assembled in any desired manner but I preferably employ the construction seen in Figs. 3 and 4, wherein the rear plate 29 of the receptacle 27 is provided with the bolts or guides 65, which by reason of their engagement with the slots 66 of the cup member, see Figs. 1 and 3, effectively guide the latter.

In order to accurately adjust as to movement per unit of scale 56 the annular member 36, I provide the vertically depending threaded stem 67 carrying the heads or weights 69, the terminal of said stem being attached to the upper bottom wall of said member, as indicated at 68. I also provide the laterally or horizontally extending threaded stem 70 carried by the front lower face of said member 36, said stem carrying the adjustable heads or weights 71 thereon, see Figs. 1 and 2, for adjustment to zero.

It will be seen from the foregoing that the receptacle 27 of the mercury seal is fixed, being secured to the rear wall 11. The structure forming the cups 18 and 25 of said mercury seal is capable of limited vertical movement. The annular member 36, the pipes 33 and 38, and the pointer 15 are capable of oscillation as a unit about their pivotal supports 46 and 50 and the lower goosenecks 37 and 32 project well up into the cups 18 and 25, so that no mercury passes into the annular tube 36, only the pressure received from the goosenecks 17 and 24 being transmitted through the lower goosenecks 37 and 32, to the internal chambers 35 and 40 of the annular pivoted member 36.

The operation is as follows:—

The static heads, whose differential is required to be measured, are brought up in the pipes 6 and 22 to the chambers above the mercury seal and the pressure is transmitted through the chambers 35 and 40 to the oil 42, see Fig. 5, on opposite sides of the partition 41. The differential, being the difference of pressure on opposite face of the partition 41, thus throws the oscillatory annular tube 36 out of equilibrium due to the differential and a consequent movement of said tube 36 itself, its adjuncts and the pointer 15 occurs.

As only pressure from the chambers 4 and 5 is transmitted by the pipes 6 and 22 through the mercury seal and thence by the goosenecks 37 and 32 and 34 and 39 to the chambers 35 and 40 it is obvious that no mercury passes through the conduits 33 and 38. As the gooseneck outlets 32 and 37 pass through the mercury 26 on a line coincident with or at about the center of the axis of the oscillatory annular tube or moving member 36, see Fig. 3, all friction arising from any oscillation of said member 36 is reduced to a minimum, thereby minimizing any liability of the gage to err.

As there is both a mass of metal in equilibrium and a mass of oil in equilibrium, there is a balancing of any temperature effect on the whole means and the readings can be readily ascertained from the position of the pointer 15 with respect to the scale 56.

For calibrating or setting to zero, I may either move the weights 71 carried by the annular tube or moving member 30 or I may adjust the pointer 15 by the proper manipulation of the adjusting screws 54 or I may adjust the scale or dial 14 by proper manipulation of the adjusting screw 57, as seen in Fig. 1, or by the equivalent adjusting screw 62 seen in Fig. 6.

It will be evident that the desired result may be accomplished by the proper manipulation of any one or all of the above elements, as will be apparent to those skilled in the art.

It will be apparent that the liquid seal 26 may be composed of mercury or any other suitable liquid and that any suitable liquid 42 may be employed in the chambers 35 and 40 of the annular tube 36 and that said tube and the cups or receptacles forming the liquid seal may be made of any suitable material.

It will be further apparent that I have produced a gage which is simple in construction, easy to erect and which after being installed in position at the boiler front, or on the gage board or elsewhere requires a minimum attention. In a contemporaneously pending application filed by me September 24th, 1917, Serial No. 193,047, I have shown and described certain features which are common to my present invention, the differentiations being pointed out in the claims herein.

It will now be apparent that I have devised a novel and useful construction of a differential gage which embodies the features of advantage enumerated as desirable in the statement of the invention and the above description, and while I have, in the present instance, shown and described a preferred embodiment thereof which will be found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a device of the character stated, the combination of a closed oscillatory annular member, having a liquid therein, a partition in the upper portion of said member, a liquid seal, connections from said seal to conduct pressures to said liquid at opposite sides of said partition, and means for conveying pressures to said seal.

2. In a device of the character stated, the combination of a liquid seal, means for conveying the pressures of static heads to said seal, an annular hollow oscillatory member having a partition in the upper portion thereof, conduits leading from chambers above said seal to said annular member on opposite sides of said partition, and indicating devices coacting with said annular oscillatory member.

3. In a device of the character stated, an annular closed tube adapted to contain a liquid and having a partition in the upper portion thereof, a liquid seal, means for conveying variations of pressure to said liquid seal, connections from said seal to chambers on each side of said partition in said annular tube, a pointer carried by said annular tube, means for adjusting the position of said pointer, a dial, and means for adjusting said dial.

4. In a device of the character stated, an annular closed tube adapted to contain a liquid and having a partition in the upper portion thereof, a liquid seal, means for conveying variations of pressure to said liquid seal, connections from said liquid seal to the interior of said annular tube, a pointer carried by said annular tube, and front and rear pivotal supports for said annular tube.

5. In a device of the character stated, a closed annular tube containing in its lower portion a body of liquid, a diametric bar for said tube, a pivot block carried by said tube, front and rear pivotal points by which said pivot block and tube are supported, a pointer carried by said tube. a liquid seal, pipes for conveying static heads to said seal, and connections from said seal to the top of said annular tube, the latter having a partition in the upper portion thereof.

6. In a device of the character stated, a casing, a stationary receptacle secured thereto and containing a liquid, movable inverted cups located above said liquid and having their lower ends submerged therein to form a liquid seal, means for conveying pressure to the surface of said liquid seal, an oscillatory annular tube having a partition in the upper portion thereof, conduits leading from the surface of said seal to each side of said partition, and indicating devices carried by said annular tube.

7. In a device of the character stated, a dial, a pointer coacting therewith, an annular tube pivotally supported, a partition in the upper portion of said tube, a two chambered liquid seal, and conduits for conveying pressure from each chamber of said seal to each side of said partition, said pressure conduits, annular tube and pointer moving as a unit.

8. In a device of the character stated, a pointer, an annular tube pivotally supported and carrying said pointer, a partition in the top of said tube, adjusting devices common to said tube and pointer, a two chambered liquid seal, and pressure conveying conduits leading from the chambers of said liquid seal to each side of said partition, said conduits, annular tube and pointer moving as a unit and the lower terminals of said pressure conduits being located in said liquid seal, in a line substantially in alinement with the pivotal points of support of said annular tube.

9. As an improved article of manufacture, a closed annular tube having a partition in the upper portion thereof, a calibrating device attached to the lower portion of said tube and comprising the threaded vertical stem 67 and the weights 69 thereon, a two-chambered liquid seal and conduits for conveying pressure from each chamber of said seal to each side of said partition.

10. As an improved article of manufacture, a closed annular tube having a partition in the upper portion thereof, a calibrating device for the lower portion thereof, comprising a laterally extending threaded stem 70, and the weights 71 thereon, a two-chambered liquid seal and conduits for conveying pressure from each chamber of said seal to each side of said partition.

11. As an improved article of manufacture, a closed annular tube having a partition in the upper portion thereof, calibrating devices for the lower portion thereof, comprising a vertical threaded stem having weights thereon, and a horizontal threaded stem having weights thereon, a two-chambered liquid seal and conduits for conveying pressure from each chamber of said seal to each side of said partition.

ABRAM T. BALDWIN.

Witnesses:
S. L. CHRISTENSON,
W. T. GORTON.